March 25, 1924.
H. L. FARGO
ASH RECEIVER
Filed Jan. 25, 1923
1,487,733
2 Sheets-Sheet 1
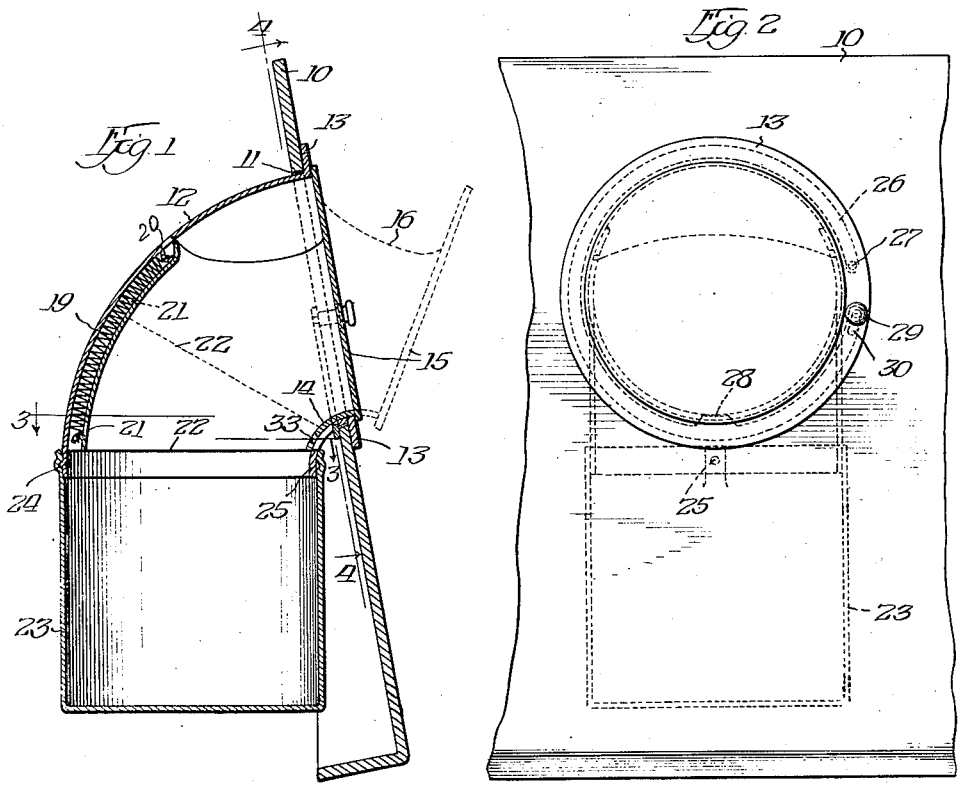
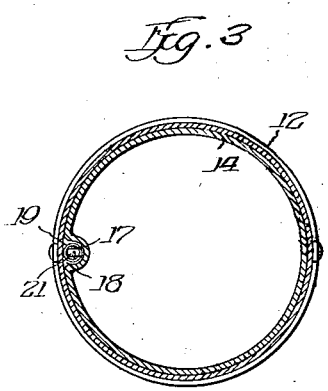
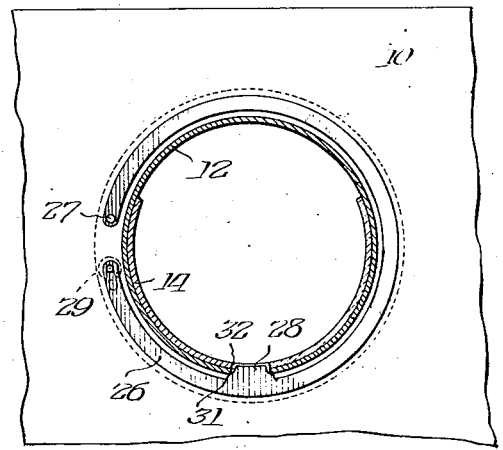

March 25, 1924.
1,487,733
H. L. FARGO
ASH RECEIVER
Filed Jan. 25, 1923
2 Sheets-Sheet 2
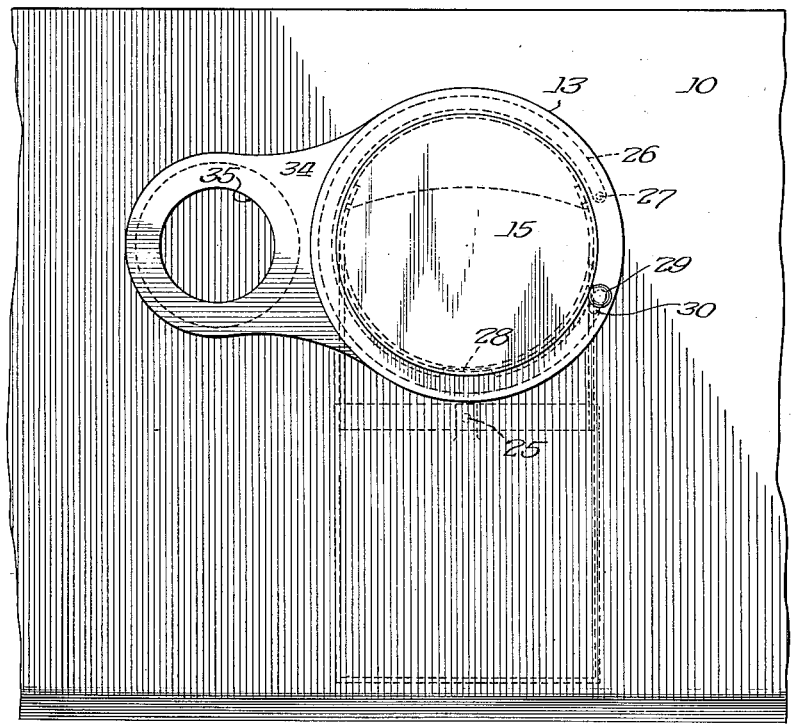

Patented Mar. 25, 1924.

1,487,733

UNITED STATES PATENT OFFICE.

HARRY L. FARGO, OF RIPON, WISCONSIN.

ASH RECEIVER.

Application filed January 25, 1923. Serial No. 614,722.

*To all whom it may concern:*

Be it known that I, HARRY L. FARGO, a citizen of the United States, residing at Ripon, in the county of Fond du Lac and State of Wisconsin, have invented certain new and useful Improvements in Ash Receivers, of which the following is a specification.

My invention relates to ash receivers and has particular reference to an ash receiver which is adapted to be secured to the instrument board of an automobile for the purpose of receiving ashes and other small articles of refuse so that the same are not dropped on the floor of an automobile or thrown out of the windows.

Another and further object of my invention is the provision of an ash receiver which is easily attached to the instrument board of an automobile and particularly which can be inserted bodily through an opening formed in the instrument board without the necessity of securing a part of the receiver back of the instrument board and necessitating a great deal of work in securing the ash receiver in position.

Another and further object of my invention is the provision of an ash receptacle which is simple in construction, which comprises few parts and which can be easily and cheaply assembled without the use of a great many tools and a consequent increase in labor costs.

Another and further object of my invention is the provision of an ash receiver which is simple in operation and which will not easily get out of order and which affords easy and convenient means adjacent the driver's seat for depositing ashes and other small articles of refuse and into which cigar and cigarette stubs can be dropped without danger of burning the upholstery of the automobile or allowing the odor from a partially consumed cigar or cigarette to pass into the car.

These and other objects of my invention will be more fully and better understood by reference to the accompanying sheet of drawings, and in which—

Figure 1 is a vertical axial sectional view of my improved invention secured in position upon an instrument board of an automobile;

Figure 2 is a front elevational view of my improved invention;

Figure 3 is a cross-sectional view on line 3—3 of Figure 1;

Figure 4 is a cross-sectional view on line 4—4 of Figure 1;

Figure 5 is a front elevational view of a modified form of my invention in which provision is made for mounting an electric lighter thereon.

Referring now specifically to the drawings, and in which like reference characters refer to like parts throughout, an instrument board 10 is shown having a circular opening 11 therein and within which is positioned a member 12 circular in cross-sectional form and elbow shaped and which has an annular flange 13 formed on the outer edge thereof which extends around the opening 11 and which abuts against the instrument board 10 and serves to retain the member 12 in position in the instrument board 10. Inside of the member 12 and in telescopic engagement therewith is a second elbow shaped member 14 having a closure member 15 at its outer end and with an opening 16 formed in the upper forward portion thereof immediately adjacent the closure member 15 through which ashes or other refuse are dropped into the member 14. The member 14 at its upper portion is bent at 17 and has a channel 18 formed therein within which a coil spring 19 is positioned, the said spring being engaged by a hook 20 secured to the upper wall of the member 12 at its forward end and upon a hook 21 formed at the rear edge 22 of the member 14 at the rear end of the spring so that the spring 21 upon the member 14 being released, as will be more fully described hereinafter, is thrown out into the dotted line position shown in Figure 1 by the action of the spring 19. A receptacle 23 is provided which has an annular depression 24 formed at its upper marginal edge and which engages an annular rib 25 extending circumferentially around the outer edge of the member 12. This is the usual means provided for holding members of this character in frictional engagement with each other and allows for easy removal of the member 23, although the member 23 may be in the form of a pipe which forms a conveyor through the floor of an automobile and provides means for conveying ashes in the receptacle out to the ground if desired.

Extending circumferentially around the member 12 near its forward edge is a spring member 26 secured by means of a pin 27 extending through the member 13, the said member 26 extending almost around the entire circumference of the member 12 and having a projection 28 at the bottom thereof with a push button 29 on its outer end which extends through a slot 30 formed in the member 13. The member 12 has an opening 31 therein through which the projection 28 extends with a second opening 32 formed at the lower side of the member 13 and into which the member 28 extends, so that the member 13 is held closed with the closure 15 against the annular portion 13 of the member 11 and by pressing downward upon the button 29 the member 13 is released because the catch 28 is pushed out of engagement with the side wall of the opening 32, allowing the spring 19 to throw the member 13 out into the dotted line position shown in Figure 1. A second opening 33 is formed in the lower wall so that the projection 28 will engage in this opening and prevent the spring from throwing the member 13 out too far or causing it to drop out of the member 12.

Referring to Figure 5, in which is shown a modified form of the device, the flange 13 has an extension or lip 34 attached thereto or formed integral therewith, as may be desired, and which has a central opening 35 formed therein within which is inserted an electrically operated device for lighting cigars, cigarettes, or the like.

In operation the device is exceedingly simple and it will be understood that the opening 11 is in the instrument board 10 is made large enough so that the whole device can be slipped into position and then screwed into the instrument board 10 by any means such as screws or the like, and can be allowed to remain in frictional engagement with the instrument board 10 so that it is held in position. If it is desired to use the device the button 29 is pressed downward, which releases the member 13 and allows the spring 19 to throw the member out so that ashes can be dropped into the device through the opening 16 and the member 14 pushed back into the member 12 and in closed position where it is held by the catch 28 on the spring 26.

When it is desired to empty the device the member 23 is removed from the member 12 by simply pulling the same away from the member 12 when the member 23 can be taken out and its contents emptied and replaced in position.

While I have described more or less precisely the details of construction of my invention, I do not wish to be understood as limiting myself thereto, as I contemplate changes in form and the proportion of parts and the substitution of equivalents as circumstances may suggest or render expedient, without departing from the spirit or scope of my invention.

I claim:

1. An ash receiver comprising in combination a pair of members in telescopic arrangement with each other, a closure member secured to one of said members at its outer end, latch means for securing the said member in closed position, and means for forcing one of said members apart from the other member into open position.

2. An ash receiver comprising in combination a hollow member, a second member in telescopic arrangement with said first member and having a closure member at its outer end and an ash receiving opening in the outer wall thereof, means for forcing said second member into open position, and a latch member adapted to hold said second member in closed position.

3. An ash receiver comprising in combination a hollow member, a second spring controlled hollow member in telescopic arrangement with the said first member having a closure member at its outer end and having an opening in the outer wall thereof, and a latch member adapted to hold said member in closed position and to act as a detent for said member in open position.

4. An ash receiver comprising in combination a hollow member having a flange on its outer portion adapted to rest against an instrument board, a second member in telescopic arrangement with the said first member and having a closure member at its outer end and an opening in the said wall thereof, a spring connected to said members and adapted to force said second member into open position and projecting beyond the said first mentioned member, and a latch adapted to hold the second member in closed position.

5. An ash receiver comprising a pair of members in telescopic arrangement with each other, one of said members being closed at its outer end and having an opening in the side wall thereof, a spring latch member adapted to hold one of said members in closed relation and act as a detent to prevent said members being thrown beyond a predetermined point in open position and a spring adapted to force one of said members beyond the end of the other member.

6. An ash receiver comprising an elbow shaped outer member, an inner member in telescopic arrangement with said first mentioned member having a closure member at its outer end and an opening in the side wall thereof, a spring anchored to said first member at its forward end and to said second member at its rear end and a latch member adapted to hold the inner member in closed position and to act as a detent to prevent the said inner member from being forced out of the said outer member.

7. An ash receiver comprising an outer cylindrical member, an inner member arranged in telescopic engagement with said outer member having a closure member at its outer end and an opening in the side wall thereof, a latch member extending circumferentially around said outer member and adapted to engage said inner member to hold the said inner member in closed position and act as a detent to prevent said member being forced beyond a predetermined point in open position and a spring adapted to force said inner member into open position.

8. An ash receiver comprising an outer cylindrical member, an inner member arranged in telescopic engagement with said outer member having a closure member at its outer end and an opening in the side wall thereof, a latch member extending circumferentially around said outer member and adapted to engage said inner member to hold the said inner member in closed position and act as a detent to prevent said member being forced beyond a predetermined point in open position, a spring adapted to force said inner member into open position and a receptacle secured to said first mentioned member.

9. An ash receiver comprising an outer cylindrical member and having a circumferentially extending flange member around its forward marginal edges and forming a means for attaching a lighter thereto, an inner member arranged in telescopic engagement with said outer member having a closure member at its outer end and an opening in the side wall thereof, a latch member extending circumferentially around said outer member and adapted to engage said inner member to hold the said inner member in closed position and act as a detent to prevent said member being forced beyond a predetermined point in open position, a spring adapted to force said inner member into open position and a receptacle secured to said first mentioned member.

10. An ash receiver comprising an outer cylindrical member and having a circumferentially extending flange member around its forward marginal edges, the said flange member having a lip formed thereon with an opening therein adapted to receive an electric lighter, an inner member arranged in telescopic engagement with said outer member having a closure member at its outer end and an opening in the side wall thereof, a latch member extending circumferentially around said outer member and adapted to engage said inner member to hold the said inner member in closed position and act as a detent to prevent said member being forced beyond a predetermined point in open position, a spring adapted to force said inner member into open position and a receptacle secured to said first mentioned member.

Signed at Ripon, Wisconsin, this 19th day of January, 1923.

HARRY L. FARGO.